US011869460B1

(12) United States Patent
Morales

(10) Patent No.: US 11,869,460 B1
(45) Date of Patent: Jan. 9, 2024

(54) APPARATUS FOR AND METHODS OF ACTION REPAIR AND/OR REGULATION OF HARMONIC STRING AND PERCUSSIVE INSTRUMENTS

(71) Applicant: Francisco Morales, Nacogdoches, TX (US)

(72) Inventor: Francisco Morales, Nacogdoches, TX (US)

( * ) Notice: Subject to any disclaimer, the term of this patent is extended or adjusted under 35 U.S.C. 154(b) by 0 days.

(21) Appl. No.: 17/691,084

(22) Filed: Mar. 9, 2022

(51) Int. Cl.
*G10C 9/00* (2019.01)

(52) U.S. Cl.
CPC .................................... *G10C 9/00* (2013.01)

(58) Field of Classification Search
CPC .................................................... G10C 9/00
See application file for complete search history.

(56) References Cited

U.S. PATENT DOCUMENTS 1,623,359 A * 4/1927 Rauworth ................ G10C 9/00 984/72
3,841,191 A * 10/1974 Jaras ........................ G10C 9/00 984/72
4,047,461 A * 9/1977 Forrest ..................... G10C 9/00 984/72

* cited by examiner

*Primary Examiner* — Robert W Horn
(74) *Attorney, Agent, or Firm* — Freeland Law, P.L.L.C.; Adam K. Freeland

(57) ABSTRACT

An action repair apparatus that grips and suspends above the action, case, and/or cabinet of the instrument having paneling disposed on the outer framework to be repositioned on various x, y, and z-axis points by various mechanisms.

16 Claims, 3 Drawing Sheets

APPARATUS FOR AND METHODS OF ACTION REPAIR AND/OR REGULATION OF HARMONIC STRING AND PERCUSSIVE INSTRUMENTS

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND

Field of Disclosure

The present disclosure described herein relates generally to applications for and methods of action repair and/or regulation of harmonic string and percussive instruments, and more particularly to applications for and methods of action repair and/or regulation of pianos, non-pipe organs, and other chordophones which will eliminate inefficiencies and expedite action repair logistics.

Description of the Related Art

There are a variety of action repair applications and tools that the industry uses for various purposes which are increasingly costly, inefficient, and fail to expedite repairs.

The problem with most action repair devices and methodologies arise from the steps preceding any action repair and/or regulation of the piano. The logistics of preparing the piano action for repair and/or regulation can be time consuming, costly, and inefficient. Furthermore, the piano action is removed from the piano and piano casing which may result in inaccuracies to repair and/or regulation wherein the piano action is displaced from the piano itself and the methodologies applied to repair and/or regulate such action are non-specific and uniform.

Therefore, a need exists to repair and/or regulate the piano action at the piano keybed resulting in piano-specific repair and tuning, maximum speed, control, and evenness.

Current repair applications include tautline regulating tools, which require removing relocating the piano action from the piano and its casing. See https://www.howardpianoindustries.com/piano-regulating-tools/; see also http://grandwork.tools/collections/all-products.

SUMMARY

By the present invention there is provided an apparatus which allows for regulation of the piano action as close as possible to the piano on its keybed without the necessity of moving the Action to a separate workbench or transporting the action to off-site piano shops and/or workshops, which poses risks of damaging the action. The present invention simply fits over the piano's case and allow for at-the-keybed regulation of the piano.

Repairing and/or regulation of a piano consists of correcting and/or adjusting the following: (1) Blow distance—the distance relation between the hammers in their rest position with string height; (2) Let-off or Scapement—the distance relation of the hammers with the strings at which point the hammer will fall back when the jack slips out from under the butt and escapes, avoiding that the hammers block the strings; (3) Drop distance—the distance that the hammers drop and rest on the repetition level after the Let-off or Scapement; and (4) Backcheck distance—the distance relation between the hammer as it is caught by the Action Backcheck after striking the strings but at which point avoids bouncing freely and uncontrollably. When these four metrics are excellently regulated, corrected, and/or adjusted, the Action acquires distinctive aftertouch results and touch feeling.

The present invention corrects piano harmonics in situations where the Action has been replaced with a new hammer set, where the original hammers have been reshaped, where consistent use requires regular tuning and resetting of the hammers, or otherwise where the instrument is not performing optimally.

Figure 1:
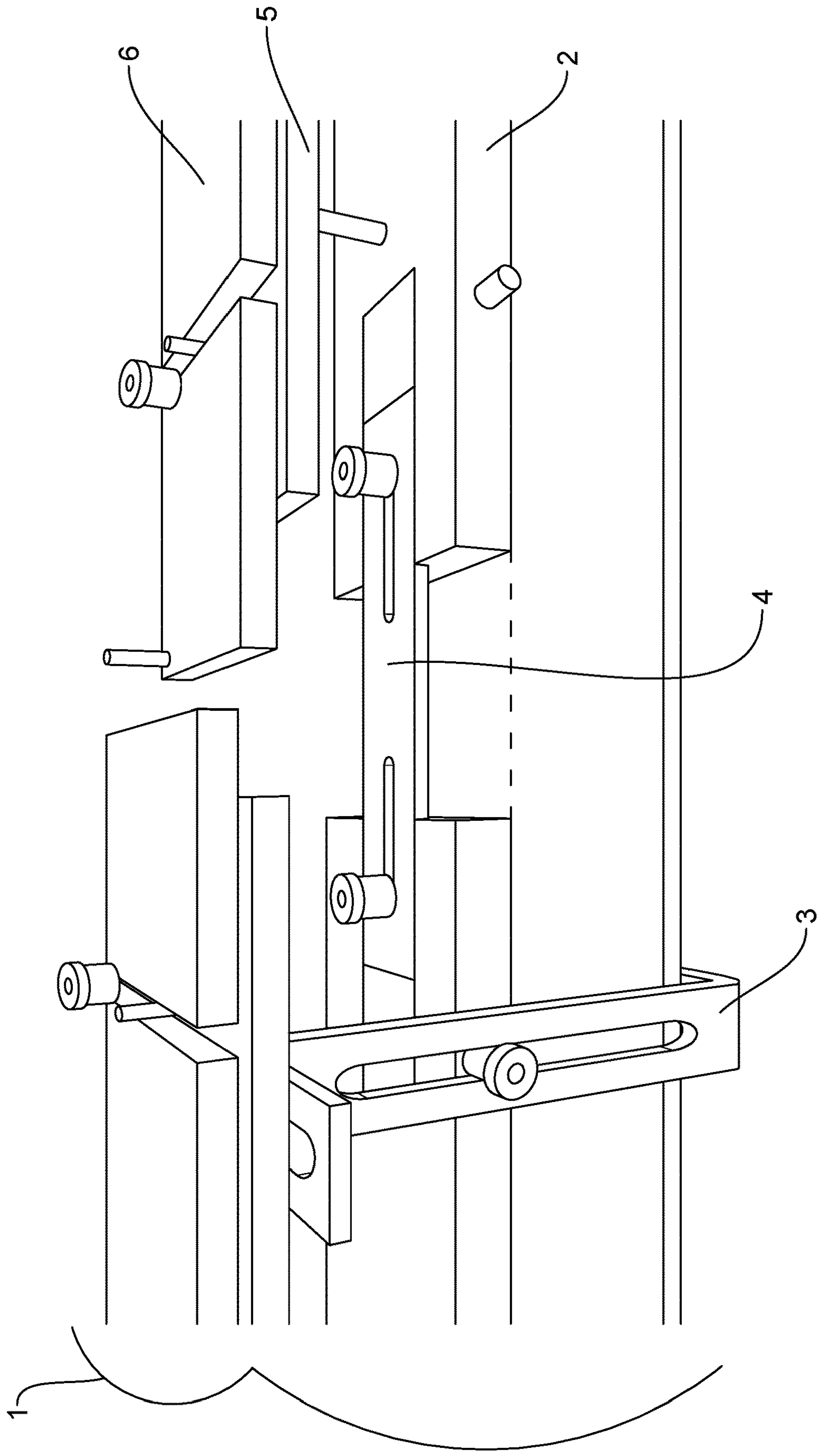
FIG. 1 illustrates a fragmented top-down view of the present invention 1 as it is resting on the instrument. For example, in one embodiment where the invention sits over a piano case, the support panel 2 rests against the case having a gripping bracket 3 to grab the case and support both the extension panel 5 and regulation panel 6.

Finally, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The foregoing description, and all changes which come within the meaning and range of equivalency of the claims are therefore intended to be embraced therein.

DETAILED DESCRIPTION OF THE DRAWINGS

The present invention is directed to an action repair apparatus 1 to sit on the case of the instrument and facilitate at-the-keybed action regulation and/or repair. In one embodiment, the apparatus grips the case of the piano over the keybed using a gripping bracket 3.

Embodiments of the gripping bracket consists of aluminum, any metal variety or combination, high-density polyethlene (HdPE), poly vinyl chloride (PVC), or any other plastic variety or combination, any wood variety or combination, or combinations thereof. The gripping bracket is adjusted by loosening and tightening knurled clamping knobs both into position over socket set screws inlaid in various locations in the support panel and in one of two locations on the gripping bracket, either the vertically extended section for adjusting the height of the extension panel 5 with the regulation panel 6 attached, or the length-wise section for adjusting the fit of the support panel 2 to the piano case. Additionally, the extension panel 5 contains two socket set screws inlaid at the opposing edges of the extension panel 5 onto which the regulation panel 6 is adjusted and secured with knurled clamping knobs.

Figure 2:
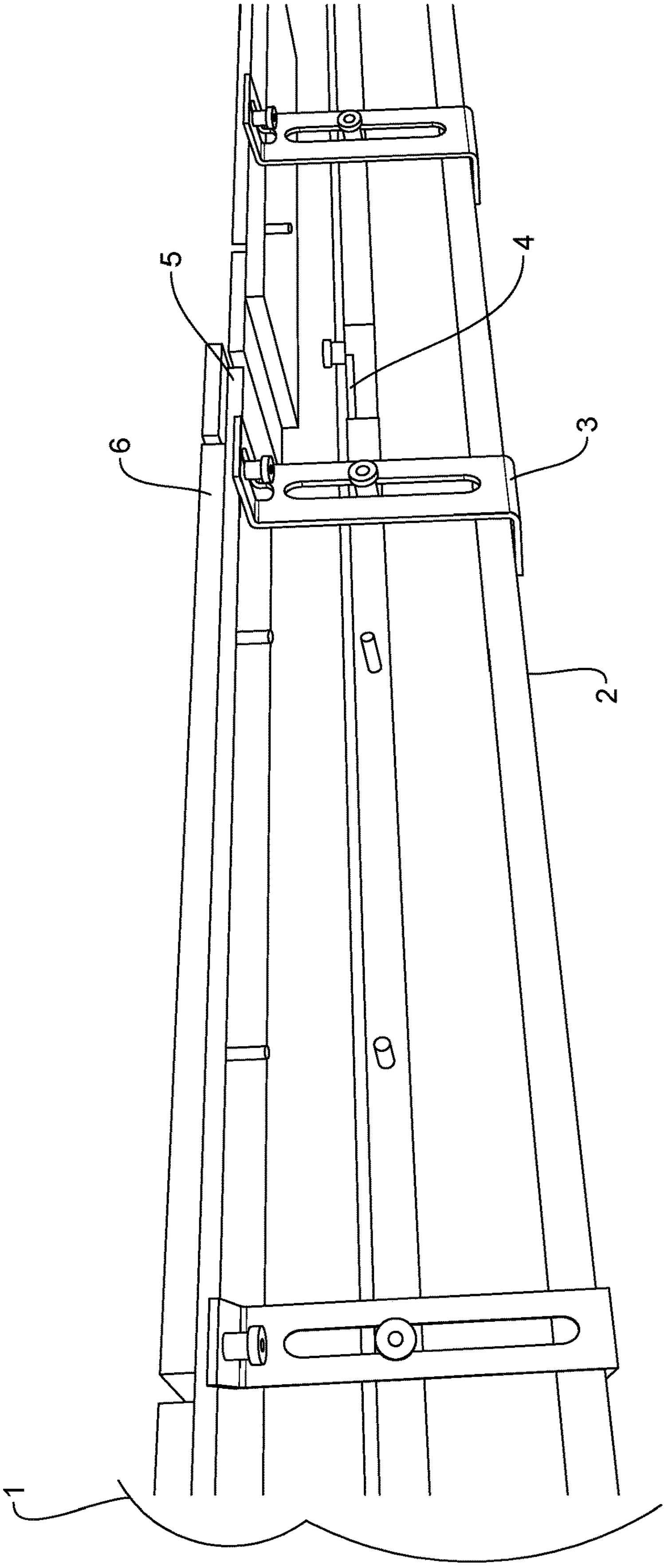
FIG. 2 illustrates a length-wise top-down view of the present invention 1 as it is resting on the instrument. For example, in one embodiment where the invention sits over a piano case, the support panel 2 rests against the case having a gripping bracket 3 to grab the case and support both the extension panel 5 and regulation panel 6.
Figure 3:
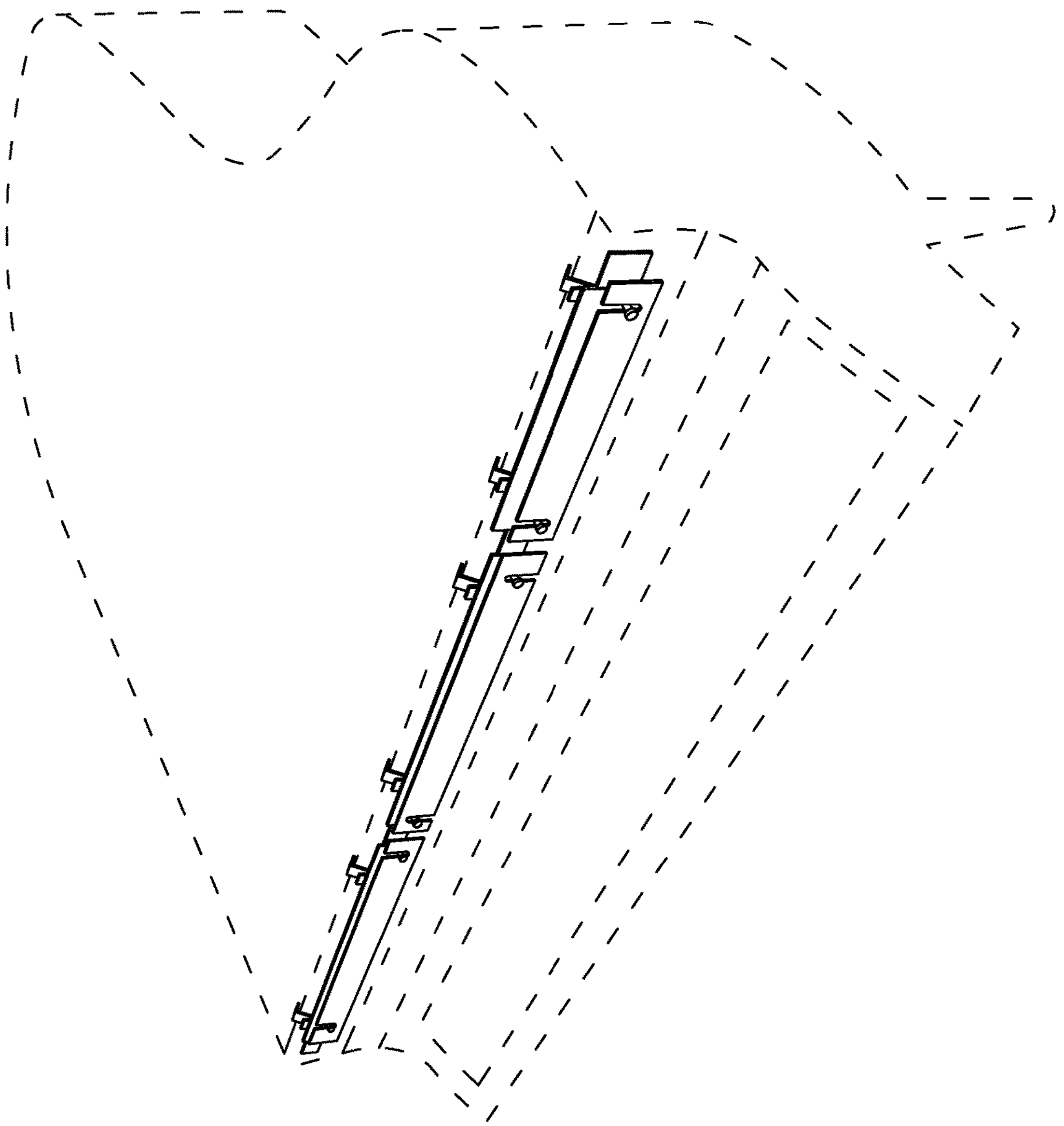
FIG. 3 illustrates a frontal view of the present invention as it is resting on a piano.

Embodiments of the support panel consists of a series of support panels (FIG. 1 and FIG. 2) connected by a coupling bracket 4 which may be adjusted by loosening and tightening knurled clamping knobs into position over socket set screws inlaid at the adjoining edges of each support panel in series.

Embodiments of the support panel, extension panel, and regulation panel consists of aluminum, any metal variety or combination, high-density polyethlene (HdPE), poly vinyl chloride (PVC), or any other plastic variety or combination, any wood variety or combination, or combinations thereof. Further embodiments of the regulation panel consist of laser material projected by traditional laser technologies transfixed to the extension panel.

Embodiments of the support panel range from 10-50 inches in length, 1-2 inches in width, and 3-4 inches in height. Embodiments of the extension panel range from 10-25 inches in length, 1-2 inches in width, and 3-4 inches in height. Embodiments of the regulation panel range from 10-25 inches in length, 1-2 inches in width, and 3-4 inches in height.

What is claimed is:

1. An action repair apparatus, the apparatus comprising:
- a support panel having a gripping bracket; and
- an extension panel in communication with the gripping bracket; and
- an adjustable regulation panel running parallel to the extension panel and in communication with the z-plane of the extension panel.

2. The support panel of claim 1 wherein the support panel is at between 16 to 27 inches long and between 1-6 inches wide.

3. The support panel of claim 1 wherein the gripping bracket where in communication with the extension panel is adjustable.

4. The support panel of claim 1 wherein the coupling bracket is adjustable.

5. The support panel of claim 1 wherein both the gripping and coupling brackets are disposed within the support panel at both proximal and distal ends on the y-plane, x-plane and/or the z-plane of the support panel.

6. The extension panel of claim 1 wherein the extension panel is at between 16 to 27 inches long and between 3-8 inches wide.

7. The extension panel of claim 1 wherein the gripping bracket where in communication with the extension panel is adjustable.

8. The extension panel of claim 1 wherein the gripping bracket is disposed within the extension panel at both proximal and distal ends on the z-plane of the extension panel.

9. The regulation panel of claim 1 wherein the regulation panel is at between 16 to 27 inches long and between 1-6 inches wide.

10. The regulation panel of claim 1 wherein the regulation panel is adjustable on its x-axis, y-axis, and z-axis.

11. The regulation panel of claim 7 wherein the regulation panel is extendable and retractable on its y-axis.

12. The regulation panel of claim 9 wherein additional paneling is disposed within the regulation paneling to allow the regulation panel to extend to lengths above 27 inches or retract to lengths below 16 inches.

13. The regulation panel of claim 7 wherein the regulation panel is detachable.

14. The action repair apparatus of claim 1 wherein the support panel is in communication with a second identically fashioned support panel in series by means of a coupling bracket.

15. The action repair apparatus of claim 1 wherein the regulation panel is instead a regulation laser means transfixed to the extension panel.

16. A method of using the action repair apparatus of claim 1 wherein:
- the action repair apparatus is fixed above the action of the instrument by the gripping bracket to secure and suspend the action repair apparatus on the instrument case such that the action repair apparatus runs lengthwise in communication and parallel with the instrument's case and hangs over the action as the action sits removed from the keybed;
- the action repair apparatus may be adjusted at the extension panel along the x, y and z axis of the support panel;
- the action repair apparatus may be adjusted at the regulation panel along the x, y and z axis of the extension panel; and
- the hammers of the instrument may communicate with the regulation panel.

* * * * *